(12) United States Patent
Daley et al.

(10) Patent No.: US 9,007,037 B2
(45) Date of Patent: Apr. 14, 2015

(54) MULTI-PHASE OPERATION WITH SINGLE PHASE CONTROL

(71) Applicants: Daniel J. Daley, Waukesha, WI (US); Craig A. Colopy, Brookfield, WI (US); Christopher J. Coughlin, Menomonee Falls, WI (US); Timothy P. Brenny, Waukesha, WI (US); Timothy M. Kromrey, Milwaukee, WI (US)

(72) Inventors: Daniel J. Daley, Waukesha, WI (US); Craig A. Colopy, Brookfield, WI (US); Christopher J. Coughlin, Menomonee Falls, WI (US); Timothy P. Brenny, Waukesha, WI (US); Timothy M. Kromrey, Milwaukee, WI (US)

(73) Assignee: Cooper Technologies Company, Houston, TX (US)

( * ) Notice: Subject to any disclaimer, the term of this patent is extended or adjusted under 35 U.S.C. 154(b) by 166 days.

(21) Appl. No.: 13/782,983

(22) Filed: Mar. 1, 2013

(65) Prior Publication Data

US 2013/0229159 A1  Sep. 5, 2013

Related U.S. Application Data

(60) Provisional application No. 61/605,627, filed on Mar. 1, 2012.

(51) Int. Cl.
*G05F 1/14* (2006.01)
*G05F 1/147* (2006.01)
*G05F 1/12* (2006.01)

(52) U.S. Cl.
CPC ..................................... *G05F 1/12* (2013.01)

(58) Field of Classification Search
USPC .................................................. 323/255, 256
See application file for complete search history.

(56) References Cited

U.S. PATENT DOCUMENTS

| | | | |
|---|---|---|---|
| 4,860,145 A * | 8/1989 | Klingbiel ........................ 361/18 |
| 5,136,233 A * | 8/1992 | Klinkenberg et al. ........ 323/343 |
| 5,428,551 A * | 6/1995 | Trainor et al. ................ 700/298 |
| 5,498,954 A * | 3/1996 | Bassett et al. ................. 323/340 |
| 5,581,173 A * | 12/1996 | Yalla et al. .................... 323/257 |
| 7,408,275 B2 * | 8/2008 | Hernandez et al. ........... 307/137 |
| 7,482,714 B2 * | 1/2009 | Rapant et al. ................. 307/137 |
| 7,615,965 B2 * | 11/2009 | Popescu-Stanesti et al. . 320/128 |
| 7,915,766 B2 * | 3/2011 | Hernandez et al. ........... 307/137 |
| 2006/0028235 A1 | 2/2006 | Rapant et al. |
| 2007/0041136 A1 | 2/2007 | Miettinen |
| 2010/0207599 A1 | 8/2010 | Blomquist et al. |

FOREIGN PATENT DOCUMENTS

KR   10-2006-0006696 A   1/2006
KR      10-0944537 B1   3/2010

OTHER PUBLICATIONS

Yang-Sun Jang, Machine Translation of "System for Controlling O.L.T. of Transformer" publication, Mar. 3, 2013.*
Tapeletro, TAP Eletro Sistemas Ltda., "Single Phase Voltage Regulator Sychronizer", R.U.A. 01, User's Manual, Rev Jan. 2011, 33 pages.
International Search Report and Written Opinion for Corresponding PCT Application No. PCT/US2013/026723, mailed Jun. 26, 2013 (11 pages).

* cited by examiner

*Primary Examiner* — Emily P Pham
(74) *Attorney, Agent, or Firm* — King & Spalding LLP (57) ABSTRACT

A multi-phase control system having multi-phase operation with single phase control includes a main control module, a lineman module, and an add-on lineman module. The main control module and the lineman module control, automatically or manually, the first phase and first phase tap changer of a multi-phase system. The add-on lineman module and the main control module control, automatically or manually, additional phases of the multi-phase system. In certain example embodiments, the multi-phase control system detects when a line voltage of an additional phase is de-energized and allows the tap changer of the additional phase to be powered by a line voltage of the first phase. In certain example embodiments, the tap changer of a de-energized phase is powered by an external power supply.

19 Claims, 4 Drawing Sheets

MULTI-PHASE OPERATION WITH SINGLE PHASE CONTROL

RELATED APPLICATION

The present application claims priority to U.S. Provisional Patent Application No. 61/605,627 titled "Multi-Phase Operation With Single Phase Control" and filed on Mar. 1, 2012, the entire contents of which are incorporated herein by reference.

TECHNICAL FIELD

The present disclosure relates generally to multi-phase voltage regulation and control in a multi-phase power system with a single phase control and to systems, methods, and devices for multi-phase voltage regulation and control with a single phase control.

BACKGROUND

Alternating current (AC) power distribution is the dominant form of power distribution. AC power distribution is commonly delivered as single phase power or multi-phase power. Multi-phase systems carry two or more alternating currents, each of which has a phase offset from the others. This allows multi-phase systems to transmit more power compared to single phase power systems. A typical example of a multi-phase system is a three-phase electric power system. In a multi-phase system, a voltage regulator controller is used to maintain local operational control of the multiple connected single phase mechanisms that make up the multi-phase system. Current multi-phase control systems are typically restricted to operation of only one of the single phase mechanisms in the multi-phase system. Multi-phase control systems capable of controlling multiple mechanisms with one control are typically dependent upon having multiple processing units for each of the multiple mechanisms and phases.

Additionally, in multi-phase systems, one or two of the phases may occasionally become non-energized due to failures or scheduled outings, often related to maintenance. When a phase is de-energized, the corresponding current may be out of phase when the non-energized phase is re-energized. This may cause the multi-phase system to become unbalanced. The present disclosure provides solutions to remedy the short-comings of existing multi-phase control.

SUMMARY

In an example embodiment, a multi-phase operation voltage regulator controller includes a main control module comprising a processor, electronically-controlled switches, and a user interface. The main control module is configured to automatically control a tap changer of a lead phase of a multi-phase power system using the electronically-controlled switches in response to a control signal of the processor. The multi-phase operation voltage regulator controller further includes a lineman module of the main control module including a mode switch and a tap change switch. The lineman module is configured to manually control the tap changer of the lead phase using the mode and tap change switches. The multi-phase operation voltage regulator controller further includes an add-on lineman module having second electronically-controlled switches, a second mode switch, and a second tap change switch. The add-on lineman module is configured to automatically control the tap changer of the second phase using the second electronically-controlled switches in response to a second control signal of the processor.

In another example embodiment, an add-on lineman module includes electronically-controlled switches, a mode switch, and a tap change switch. The add-on lineman module is configured to manually control a tap changer of an additional phase of a multi-phase power system and to automatically control the tap changer of the additional phase, wherein the add-on lineman module is couplable to a main control module of a multi-phase operation voltage regulator controller, and wherein the add-on lineman automatically controls the tap change of the second phase according to a control signal from the main control module.

In another example embodiment, a method for powering a de-energized phase includes detecting, by a processor, a drop in line voltage of a first phase of a multi-phase power system, detecting a selection of internal power on a power mode selector, and when internal power is selected, coupling, by the processor, a circuit path between a second phase and the first phase of the multi-phase power system.

BRIEF DESCRIPTION OF THE DRAWINGS

For a more complete understanding of the example embodiments of the present invention and the advantages thereof, reference is now made to the following description in conjunction with the accompanying drawings in which.

The drawings illustrate only example embodiments of the invention and are therefore not to be considered limiting of its scope, as the invention may admit to other equally effective embodiments. The elements and features shown in the drawings are not necessarily to scale, emphasis instead being placed upon clearly illustrating the principles of example embodiments of the present invention. Additionally, certain dimensions may be exaggerated to help visually convey such principles.

DETAILED DESCRIPTION OF EXAMPLE EMBODIMENTS

Embodiments of the disclosure are directed to voltage regulation and control of a multi-phase system using single phase control. Though the present disclosure describes certain example embodiments with respect to having a lead phase, a first additional phase, and a second additional phase, the elements and techniques described herein are applicable to multi-phase systems having any number of phases. Any description making reference to a specific voltage value (e.g., 120VAC) is included for example and context purposes and is not meant to be limiting. In the description, well known components, methods, and/or processing techniques are omitted or briefly described so as not to obscure the invention. As used herein, the "present invention" refers to any one of the embodiments of the invention described herein and any equivalents, but is not limiting to the embodiments described herein. Furthermore, reference to various feature(s) of the "present invention" is not to suggest that all embodiments must include the referenced feature(s). The following description of example embodiments refers to the attached drawings.

Turning now to the drawings, in which like numerals indicate like elements throughout, example embodiments of the invention are described in detail.

Figure 1:
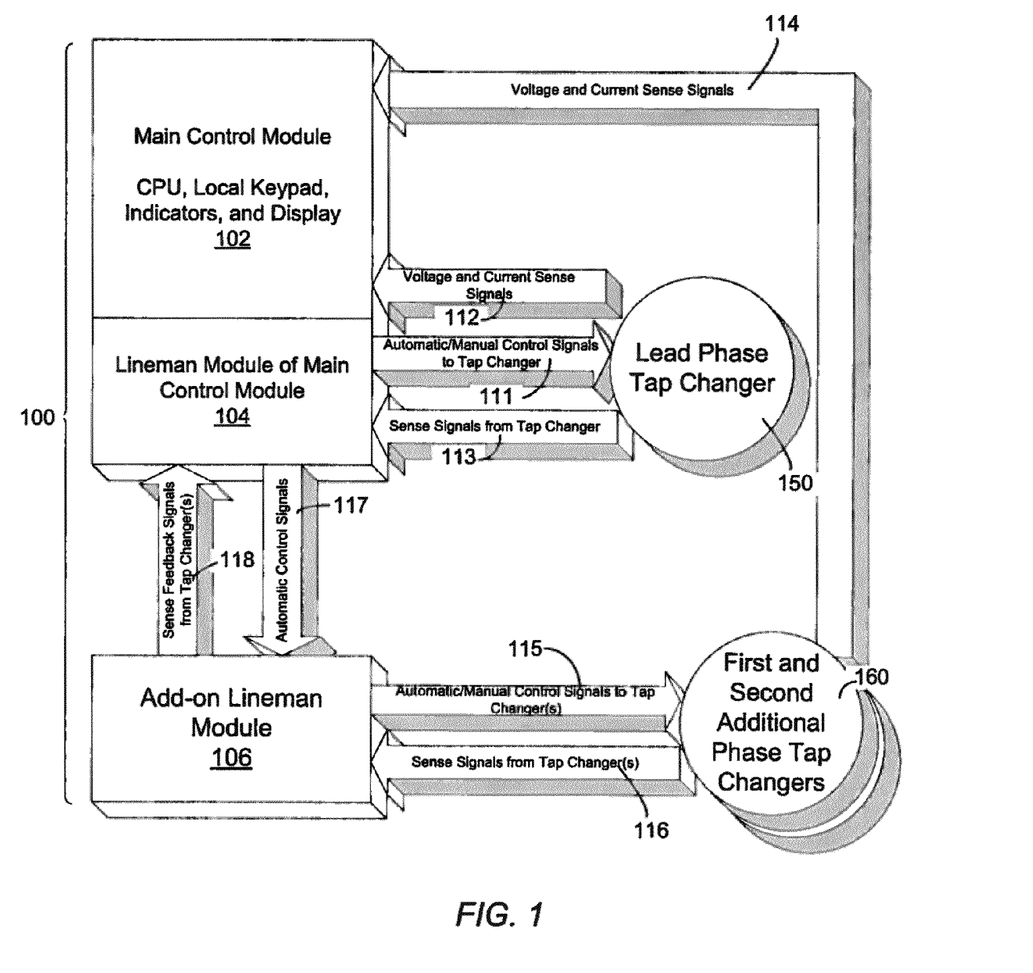
FIG. 1 illustrates an embodiment of a voltage regulator controller in accordance with certain example embodiments.
Figure 2:
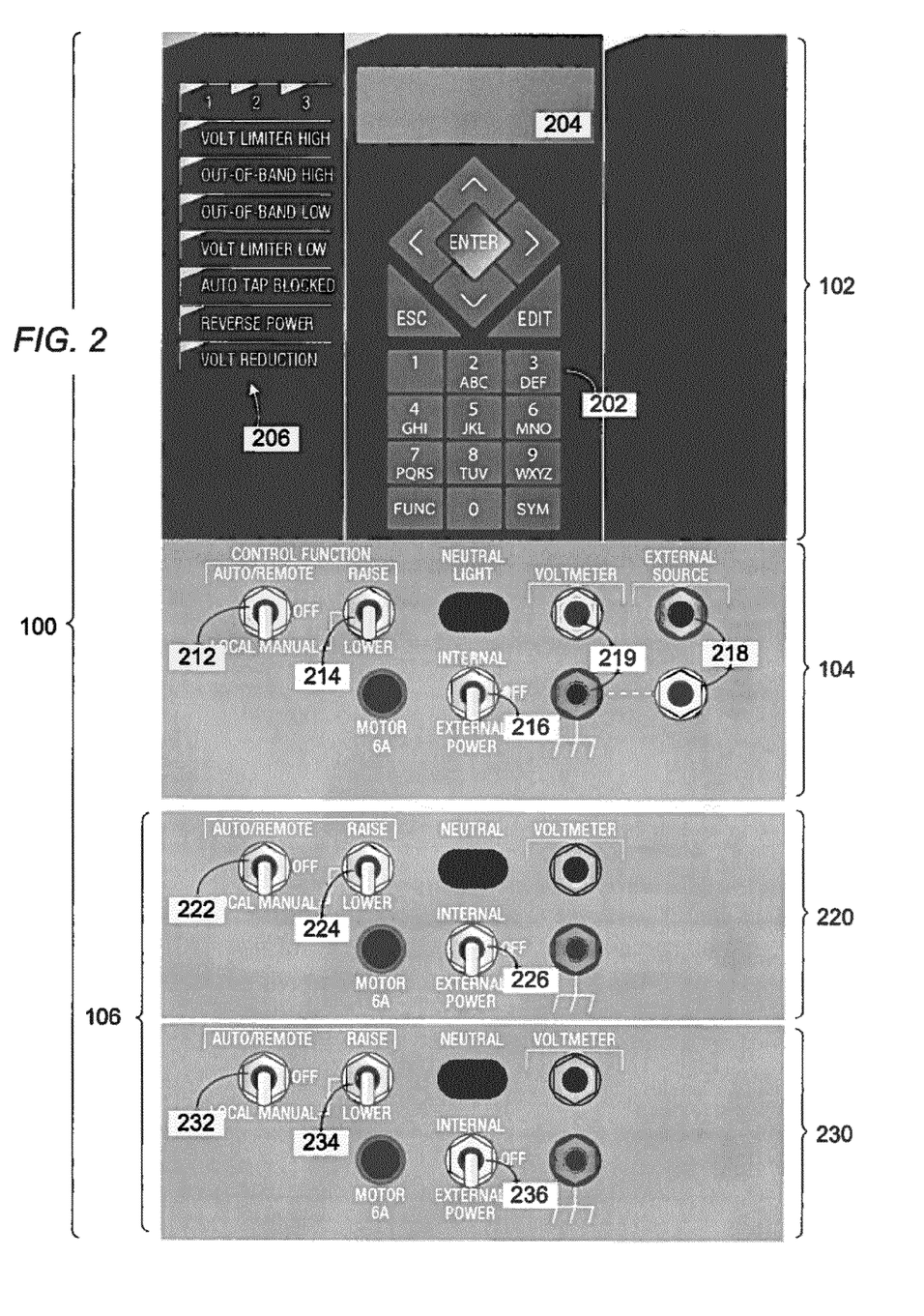
FIG. 2 illustrates an example of a front panel of the voltage regulator controller, in accordance with certain example embodiments.

Turning to FIGS. 1 and 2, a voltage regulator controller 100 according to an example embodiment of the present invention is described. FIG. 1 illustrates an example block diagram of the voltage regulator controller 100 and FIG. 2 illustrates an example of a front panel of the voltage regulator controller 100. As illustrated, the voltage regulator controller 100 comprises a main control module 102, a lineman module 104, and an add-on lineman module 106. The main control module 102 and the lineman module 104 comprise a voltage regulator to automatically or manually regulate a voltage of a lead phase of a multi-phase power delivery system. The voltage regulator controller 100 regulates the voltage of the lead phase using a lead phase tap changer 150. In certain example embodiments, the main control and lineman modules 102 and 104 may regulate the lead phase so that it maintains a near-constant 120VAC nominal secondary output line voltage based on configurations of the voltage regulator controller 100. It is noted that the voltage regulator controller 100 may regulate the voltage of the lead phase to a range of voltages other than 120VAC. The lead phase tap changer 150 comprises a multi-tap transformer or autotransformer, for example, as understood in the art. In other words, the lead phase tap changer 150 comprises mechanical and electrical components to select one of several tap positions to regulate the voltage of the lead phase, as understood in the art. When the tap changer 150 changes tap positions, a corresponding increase or decrease in line voltage of the lead phase results.

In certain example embodiments, the main control module 102 comprises a processor that automatically controls the operation of the lead phase tap changer 150, a display 204 for monitoring conditions, a local keypad 202 for interfacing with the processor, and other indicators 206 that indicate the status of the main control and lineman modules 102 and 104. In certain example embodiments, the main control module 102 includes a user interface including an output portion and an input portion other than the combination of a display 204 and a keypad 202. Additionally, the lineman module 104 comprises a plurality of switches 212, 214, and 216 to manually control the operation of the lead phase tap changer 150, along with connection terminals 218 and 219 for feeding power to the tap changer, if necessary, and checking a voltage of the lead phase, respectively.

To regulate the voltage of the lead phase, the main control and lineman modules 102 and 104 provide control signals 111 to the lead phase tap changer 150. Depending upon the mode of operation of the voltage regulator controller 100, the control signals 111 may be provided either manually (i.e., by a lineman) or automatically (i.e., by the processor). Particularly, in certain example embodiments, the auto/manual or mode switch 212 may be used to configure the voltage regulator controller 100 into either automatic (auto/remote) or manual (local manual) voltage regulation of the lead phase, as illustrated. Generally, the lineman module 104 may be used by a lineman or field technician to manually control the operation of the tap changer 150 and the main control module 102 is configured to automatically control the operation of the tap changer 150. The switch 212 also includes an off position. When the switch 212 is at the off position, the voltage regulator controller 100 does not regulate the voltage of the lead phase either automatically or manually.

When the switch 212 is set to automatic mode, the processor of the main control module 102 relies on voltage and current sense signals 112 from the lead phase to determine whether the lead phase tap changer 150 should be controlled to a new tap position. That is, in certain example embodiments, based on the voltage and current sense signals 112, the processor may determine that the voltage of the lead phase is out of bounds (i.e., too high or too low) with reference to a desired range of line voltage of the lead phase, and control the tap changer 150 to make a corresponding and appropriate tap change using the control signals 111. For example, the control signals 111 may deliver the power necessary to drive a motor of the lead phase tap changer 150. The power necessary to drive the motor of the lead phase tap changer 150 may be electronically switched on or off using electronically-controlled switches and/or other associated circuitry of the voltage regulator controller 100 under supervision and control of the processor of the main control module 102. For example, the power necessary to drive the motor of the lead phase tap changer 150 may be electronically switched on or off using TRIACs, relays, or Integrated Gate Bipolar Transistors (IGBTs), among other devices. Using the electronically-controlled switches, the main control module 102 is able to permit the flow of current to power the motor of the lead phase tap changer 150 when a tap change is needed. When providing the control signals 111, the voltage regulator controller 100 may rely on the sense signals 113 from the lead phase tap changer 150 to determine when a tap position change is complete.

When the switch 212 is set to manual mode, the lineman may rely on the voltage and current sense signals 112 from the lead phase to determine whether the lead phase tap changer 150 should be controlled to a new tap position. That is, the lineman may read the display 204 and/or the indicators 206, which are updated by the processor of the main control module 102 based on the voltage and current sense signals 112, to determine whether the lead phase tap changer 150 should be controlled to a new tap position. Alternatively or additionally, the lineman may also manually check the voltage of the lead phase using the voltage connection terminals 219. In certain example embodiments, the lineman is able to control the lead phase tap changer 150 to a new tap position by using the raise/lower tap change switch 214. When using the raise/lower switch 214, the control signals 111 deliver the power necessary to drive the motor of the lead phase tap changer 150 to a new tap position. It is noted that, in the manual mode of operation, the raise/lower switch 214 manually controls the electronically-controlled switches of the voltage regulator controller 100. Specifically, when the auto/manual switch 212 is set to manual mode, the electrically-controlled switches manually provide power to the motor of the lead phase tap changer 150 based on the raise/lower switch 214 and not based on automatic control signals from the processor of the main control module 102. Using the internal/external power switch 216, the lineman can select whether the power to drive the motor of the lead phase tap changer 150 is supplied internally (i.e., from the line voltage of the lead phase itself) or from an external source via the external source terminals 218.

The add-on lineman module 106 comprises circuitry necessary to control additional phases for voltage regulation in both automatic and manual modes of operation. In an example embodiment, and as described herein, the add-on lineman module 106 is configured to regulate two additional phases using the additional phase tap changers 160. However, in certain other example embodiments, more or less than two phases could be regulated by an extension of the circuitry of the add-on lineman module 106. The add-on lineman module 106 comprises electronically-controlled switches, such as TRIACs, relays, or IGBTs, and other associated circuitry necessary for control of the additional phase tap changers 160. Additionally, the add-on lineman module 106 comprises the circuitry necessary to receive sense signals 116 from the additional phase tap changers 160 and relay those signals to the main control module 102 as sense feedback signals 118, for each tap changer of the two additional phase tap changers 160.

Automatic control of the additional phase tap changers 160 is achieved by the main control module 102 via the add-on lineman module 106. Based on the voltage and current sense signals 114 received from the additional phases, the main control module 102 passes automatic control signals 117 to the add-on lineman module 106 to regulate the line voltages of the additional phases. That is, when the switches 222 and 232 of the add-on lineman module 106 are set to automatic mode (auto/remote position), the automatic control signals 117 from the main control module 102 act as control signals to switch the electronically-controlled switches and other associated circuitry of the add-on lineman module 106 to control the additional phase tap changers 160. In turn, power to change tap positions is provided (via the control signals 115) to motors of the additional phase tap changers 160. When changing tap positions of the additional phase tap changers 160, the add-on lineman module 106 receives the sense signals 116 and relays those signals to the main control module 102 as sense feedback signals 118. Thus, the main control module 102 may determine when the additional phase tap changers 160 have completed tap change operations.

As for manual control of the first and second additional phases, the add-on lineman module 106 comprises a first section 220 including switches 222, 224, and 226 for manual control of the first additional phase tap changer 160, and second section 230 including switches 232, 234, and 236 for manual control of the second additional phase tap changer 160.

As for the first section 220, the auto/manual switch 222 determines whether the first additional phase is voltage regulated manually by a lineman using the raise/lower switch 224 or automatically by the main controller 102 via the automatic control signals 117. In certain example embodiments, when the switch 222 is set to manual mode, the lineman is able to control the first additional phase tap changer 160 to a new tap position using the raise/lower switch 224. That is, when the switch 222 is set to manual mode, the control signals 115 deliver the power necessary to drive the motor of the first additional phase tap changer 160 to a new tap position based on the position of the raise/lower switch 224. It is again noted that, in the manual mode of operation, the raise/lower switch 224 is relied upon to control the electronically-controlled switches of the add-on lineman module 106 to deliver power to the motor of the first additional phase tap changer 160. Using the internal/external power switch 226, the lineman can select whether power to drive the motor of the first additional phase tap changer 160 is supplied internally (i.e., from the line voltage of the first additional phase itself) or from an external source via the external source terminals 218.

The second section 230 operates similarly as the first section 220, but with respect to voltage regulation of the second additional phase. That is, the second section 230 comprises circuitry for both automatic and manual voltage regulation of the second additional phase. Further, the switches 232, 234, and 236 of the second section 230 may be used by a lineman to manually control the second additional phase tap changer 160.

It is noted that, based on segregation of control, sense, feedback, and drive circuitry among the main control and lineman modules 102 and 104 and the add-on lineman module 106, no significant additional cost may be attributed to the main control and lineman modules 102 and 104 for voltage regulation of the additional two phases when using the add-on lineman module 106. Thus, the main control and lineman modules 102 and 104 may be manufactured and sold with the option to voltage regulate additional phases without a significant increase in cost, and the add-on lineman module may be purchased separately if automatic and manual voltage regulation of the additional phases is desired. It is further noted that the total cost of the main control, lineman, and the add-on lineman modules 102, 104, and 106 for automatic and manual control of three phases may be significantly less than the total cost of three separate main control and lineman modules 102 and 104 for automatic and manual control of the same three phases.

Figure 3:
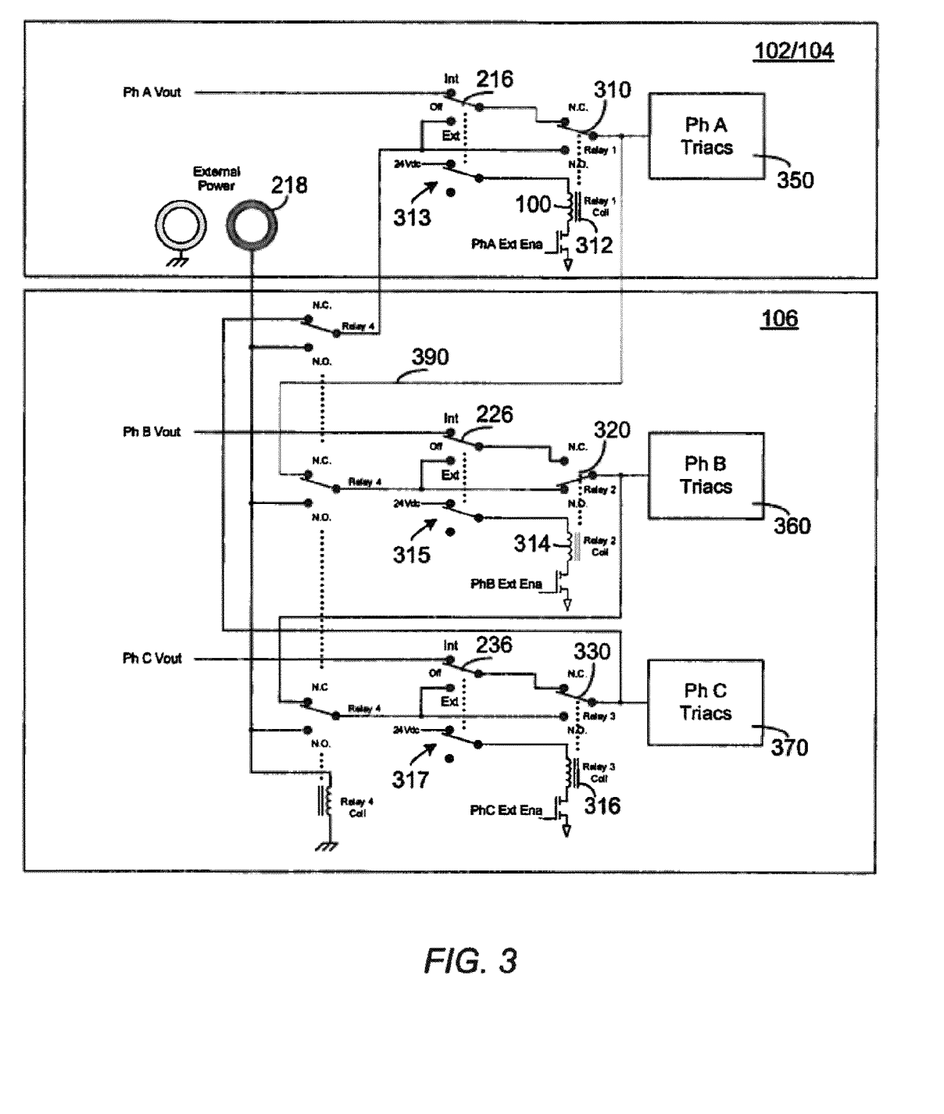
FIG. 3 illustrates an example schematic diagram of certain elements of the voltage regulator controller, in accordance with certain example embodiments.

Turning to FIG. 3, one aspect of the operation of the voltage controller 100 is described in further detail with reference to an example schematic diagram of certain elements of the voltage regulator controller 100. As noted above, the power provided to a motor of a tap changer may be provided by the line voltage of the phase being regulated by the tap changer. With reference to FIG. 3, the "Ph A Vout" reference designates the line voltage of the lead phase being voltage regulated by the main controller 102. Power from the lead phase passes through the switch 216, which is set to internal power, and through the switch contacts of relay 310, before being provided to the TRIACs 350. Consistent with the description provided above, the TRIACs 350 are used to electronically switch power on or off to the motor of the lead phase tap changer 150 in response to a control signal provided by the processor of the main control module 102. Similarly, power is provided to the TRIACs 370 by the second additional phase line voltage "Ph C Vout". It is noted that the TRIACs 350, 360, and 370 may comprise any electronically-controlled switch, as described above.

In the condition that the line voltage "Ph B Vout" of the first additional phase de-energizes or drops to zero (or near zero) due to system failure, disconnection for repair, or any other reason, the processor of the main control module 102 detects the drop in line voltage over the voltage and current sense signals 114. In this condition, generally, the first additional phase tap changer 160 cannot be controlled to change tap positions because no power is available from the first additional phase to power the motor of the first additional phase tap changer 160. If this lack of power continues for an extended period of time while the lead and second additional phases are still voltage regulated, the tap positions of the lead and second additional phases may drift to positions distant from the last position of the first additional phase. When the line voltage of the first additional phase returns, the multi-phase power delivery system may be especially unbalanced because the lead and second additional phases have regulated to different tap positions than the first additional phase. This condition is undesirable and may cause system damage.

Thus, to address this condition, when the processor of the main control module 102 detects the drop in line voltage of the first additional phase, it is configured to automatically switch contacts of relay 320 by energizing the relay coil 314 via the "PhB Ext Ena" signal. In this case, it is noted that the internal/external power switch 226 is bypassed and power is provided to the TRIACs 360 from the line voltage of the lead phase "Ph A Vout" over the coupling 390. Particularly, the coupling 390 provides a circuit path between the line voltage "Ph A Vout" of the lead phase and the TRIACs 360, and power may be provided to the first additional phase tap changer 160, as necessary, to change tap positions. Similarly, the processor of the main control module may automatically switch contacts of the relays 310 or 330 by energizing the relay coils 312 and 316, respectively, if the line voltage of either the lead or second additional phases drops to zero. For example, in certain embodiments, if the line voltage of the second additional phase drops to zero, power may be provided to the second additional tap changer 160 from the line voltage of the first additional phase. In certain example embodiments, when a line voltage of one phase is de-energized, power may be supplied to the tap changer of the de-energized phase from the line voltage of any of the remaining energized phases.

As a safety measure, a pole of each of the internal/external switches 216, 226, and 236 is coupled, respectively, to control switches 313, 315, and 317. However, control switches 313, 315 and 317 are optional and may be omitted in alternate embodiments. As illustrated in FIG. 3, the control switches 313, 315, and 317 connect or disconnect a 24 VDC power supply that energizes the relay coils 312, 314, and 316, respectively, based on the "PhA Ext Ena," "PhB Ext Ena," and "PhC Ext Ena" control signals from the processor of the main control module 102. Thus, if a lineman switches the internal/external switch 226 to either the off or external positions (that is, anything other than the internal position), the 24 VDC power supply is disconnected from and cannot energize the relay coil 314 regardless of the "PhB Ext Ena" control signal from the processor. This prevents the automatic connection of line voltage "Ph A Vout" from the lead phase to the TRIACs 360 when the internal/external switch 226 of the first section 220 of the add-on lineman module 106 is set to any position other than internal power. The internal/external switches 216 and 236 are similarly connected, as illustrated in FIG. 3, to prevent automatic connection of line voltages between phases automatically when switched to external power.

Figure 4:
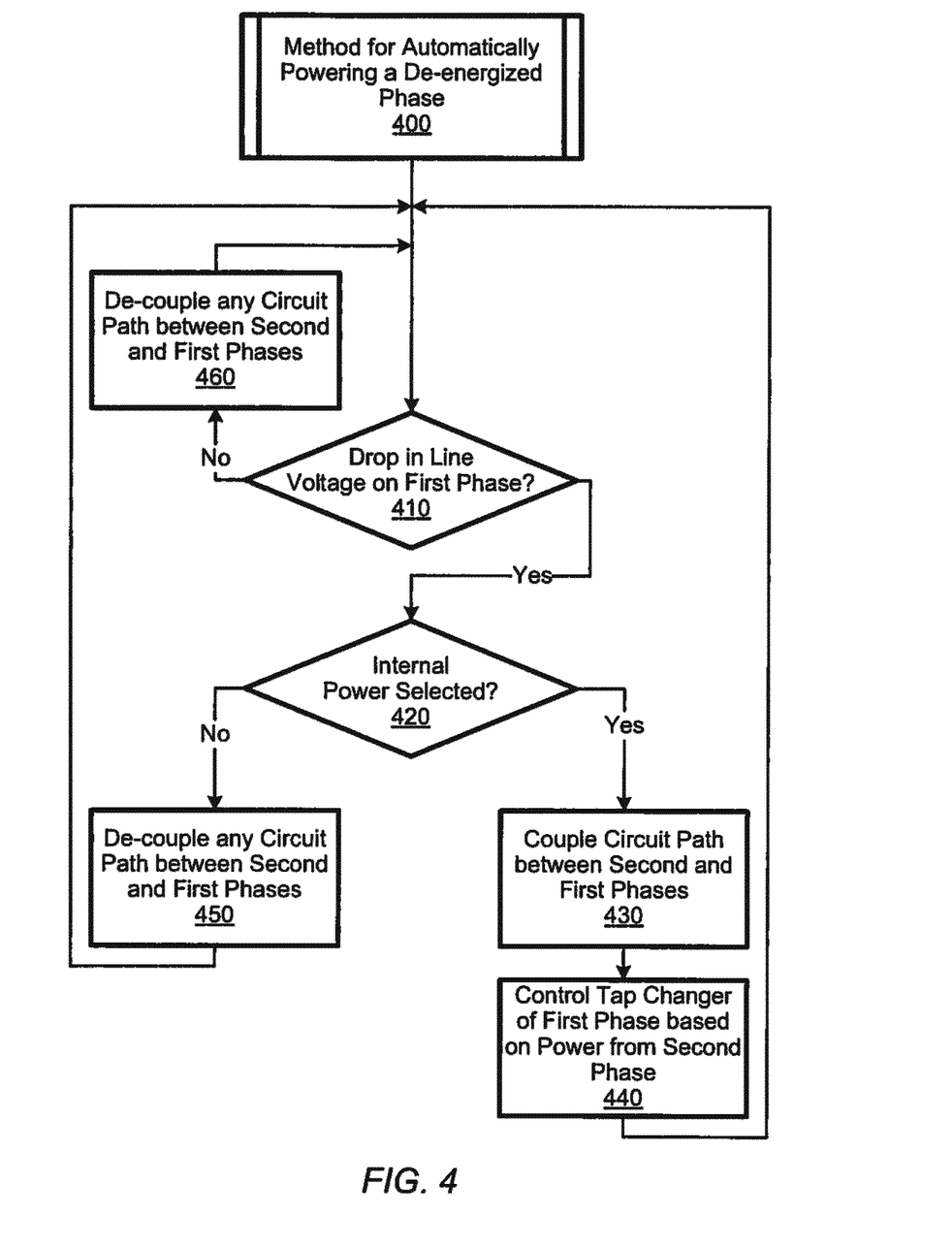
FIG. 4 illustrates an embodiment of a method for automatically powering a de-energized phase, in accordance with certain example embodiments.

Turning to FIG. 4, an embodiment of a method 400 for automatically powering a de-energized phase is described. At step 410, the processor of the main control module 102 detects a drop in line voltage of a first phase of a multi-phase power system. For example, with reference to FIG. 1, the processor of the main control module 102 may detect that the first additional phase has de-energized based on the voltage sense signals 114. In this condition, the processor identifies that the first additional phase may not be able to supply the power necessary to change tap positions using the first additional phase tap changer 160. In other words, the tap positions of the first additional phase tap changer 160 cannot be updated by the processor of the main control module 102 in automatic mode because no power is available on the line output of the first additional phase to power the motor of the first additional phase tap changer 160. As noted above, this condition is undesirable especially if the lead and second additional phases are voltage regulated to tap positions distant from that of the first additional phase. It is noted that, although the line voltage of the first additional phase has dropped, the main controller 102 may still seek to regulate the tap position of the first additional phase to a position similar to or the same as the tap position of one of the lead phase and the second additional phase, for example. If the tap position of the first additional phase is regulated to a position similar to or the same as the tap position of one of the lead phase and the second additional phase, it is more likely that the system will remain balanced when the first additional phase is re-energized and the line voltage of the first additional phase returns.

Thus, after the processor of the main control module 102 detects that the line voltage of the first additional phase has dropped based on the voltage sense signals 114, the method proceeds to step 420 where it is detected whether internal or external power is selected for the first additional phase. For example, the internal/external power switch 226 may be used to detect whether internal or external power is selected for the first additional phase. In certain example embodiments, if internal power is detected, the process proceeds to step 430 where a circuit path between a second phase and the first phase of the multi-phase power system is coupled based on a control signal from the processor of the main control module 102. As illustrated in FIG. 3 and discussed above, the processor may provide the control signal "Ph B Ext En" to energize the relay coil 314, thereby bypassing the internal/external power switch 226 using the switch contacts of relay 320 and coupling the circuit path 390 between the lead phase and the first additional phase of the multi-phase power system. After power is coupled between the lead phase and the first additional phase via the circuit path 390, power is supplied to the TRIACs 360 of the first additional phase.

Once power is provided to the TRIACs 360, the processor of the main controller 102 is able to control the first additional phase tap changer 106, as necessary, at step 440. For example, the processor of the main controller 102 may control the tap position of the first additional phase tap changer 160 to have a tap position based on one of the tap positions of the lead phase or the second additional phase. While power is coupled to the first additional phase from the lead phase, the process returns to step 410, to determine whether the first additional phase is still de-energized. If not, the processor de-couples any circuit path, such as the path 390, between the second (i.e., lead) and first phases.

Alternatively, if it is determined by the processor that the first additional phase is still de-energized, the process proceeds again to step 420 where any change from internal to external power is detected. In this case, for example, if the internal/external power switch 226 is set to external power at step 420, the process proceeds to step 450 where any circuit path between the second and first phases is de-coupled. As described above with reference to FIG. 3, a pole of the internal/external switch 226 is coupled to control switch 315 which disconnects the 24 VDC power supply energizing the relay coil 314, regardless of the "Ph B Ext Ena" control signal from the processor of the main control module 102. In this manner, any circuit path between the second and first phases is de-coupled at step 450.

Using the method 400 for automatically powering a de-energized phase, a tap position of the de-energized phase may be maintained at a position consistent with that of other phases in a multi-phase system. Thus, when the de-energized phase is re-energized, the multi-phase system is more likely to return to balanced operation in a short period of time.

Although embodiments of the present invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

What is claimed is:

1. A multi-phase operation voltage regulator controller, comprising:
   a main control module comprising a processor, electronically-controlled switches, and a user interface, the main control module being configured to automatically control a tap changer of a lead phase of a multi-phase power system using the electronically-controlled switches in response to a first control signal of the processor;
a lineman module coupled to the main control module comprising a mode switch and a tap change switch, the lineman module being configured to manually control the tap changer of the lead phase using the mode switch and tap change switch; and
an add-on lineman module comprising second electronically-controlled switches, a second mode switch, and a second tap change switch, the add-on lineman module being configured to automatically control a tap changer of a second phase using the second electronically-controlled switches in response to a second control signal of the processor,
wherein the main control module is configured to automatically control the tap changer of the second phase using the electronically-controlled switches in response to the second control signal from the processor.

2. The multi-phase operation voltage regulator controller of claim 1, wherein the add-on lineman module is configured to manually control the tap changer of the second phase of the multi-phase power system.

3. The multi-phase operation voltage regulator controller of claim 1, wherein
the add-on lineman module further comprises third electronically-controlled switches, a third mode switch, and a third tap change switch, and
the add-on lineman module is further configured to manually control a tap changer of a third phase of the multi-phase power system and to automatically control the tap changer of the third phase using the third electronically-controlled switches in response to a third control signal of the processor.

4. The multi-phase operation voltage regulator controller of claim 1, wherein the tap changer of the second phase is powered by a line voltage of the second phase.

5. The multi-phase operation voltage regulator controller of claim 1, wherein the processor of the main control module is configured to detect de-energization of a line voltage of the second phase, and provide a power control signal to couple power from the lead phase to the second electronically-controlled switches.

6. The multi-phase operation voltage regulator controller of claim 5, wherein the add-on lineman module comprises a bypass relay, wherein the bypass relay is energized to couple the power from the lead phase to the second electronically-controlled switches.

7. The multi-phase operation voltage regulator controller of claim 5, comprising a power source selector, the power source selector comprising an internal power state and an external power state.

8. The multi-phase operation voltage regulator controller of claim 7, wherein when the power source selector is in the external power state, the power from the lead phase is decoupled from the second electronically-controlled switches.

9. The multi-phase operation voltage regulator controller of claim 8, wherein when the power source selector is in the external power state, the second electronically-controlled switches are coupled to an external power source.

10. The multi-phase operation voltage regulator controller of claim 1, wherein the electronically-controlled switches are selected from a group consisting of a triode for alternating current, a relay, and an insulated-gate bipolar transistor.

11. An add-on lineman module, comprising:
electronically-controlled switches, a mode switch comprising an automatic state and a manual state, and a tap change switch, wherein the add-on lineman module is couplable to a main control module of a multi-phase operation voltage regulator controller, wherein the main control module controls a tap changer of a lead phase;
wherein the add-on lineman module is configured to manually control a tap changer of an additional phase of a multi-phase power system when the mode switch is set to the manual state; and
wherein the add-on lineman module is configured to automatically control the tap changer of the additional phase according to a control signal from the main control module when the mode switch is in the automatic state.

12. The add-on lineman module of claim 11, comprising:
second electronically-controlled switches, a second mode switch comprising a second automatic state and a second manual state, and a second tap change switch,
wherein the add-on lineman module is configured to manually control a tap changer of a second additional phase of the multi-phase power system when the mode switch is set to the manual state; and
wherein the add-on lineman module is configured to automatically control the tap changer of the second additional phase using the second electronically-controlled switches in response to a second control signal from the main control module when the mode switch is set to the automatic state.

13. The add-on lineman module of claim 11, wherein the electronically controlled switches are selected from a group consisting of a triode for alternating current, a relay, and an insulated-gate bipolar transistor.

14. The add-on line module of claim 11, wherein the tap changer of the additional phase is powered by a line voltage from the additional phase.

15. The add-on lineman module of claim 11,
wherein the add-on lineman module comprises a bypass relay;
wherein the main control module is configured to detect de-energizing of a line voltage of the additional phase, and provide a power control signal to energize the bypass relay and couple power from a lead phase to the electronically-controlled switches; and
wherein the add-on lineman module further comprises a control switch to prevent energizing of the bypass relay by the main control module.

16. A method for powering a de-energized phase, comprising:
detecting, by a processor, a drop in line voltage of a first phase of a multi-phase power system;
detecting a selection of internal power on a power mode selector;
when internal power is selected, coupling, by the processor, a circuit path between a second phase and the first phase of the multi-phase power system; and
controlling, by the processor, a tap changer of the first phase based on power coupled by the circuit path between the second phase and the first phase.

17. The method for powering said de-energized phase of claim 16, comprising:
detecting a selection of external power on the power mode selector;

in response to detection of the selection of external power mode, de-coupling the circuit path between the second phase and the first phase of the multi-phase power system; and receiving power from an external power supply.

18. The method of powering said de-energized phase of claim 17, comprising:

controlling the tap changer of the first phase based on power from the external power supply.

19. The method of powering said de-energized phase of claim 16, wherein the power mode selector can be selected automatically or manually.

\* \* \* \* \*